UNITED STATES PATENT OFFICE.

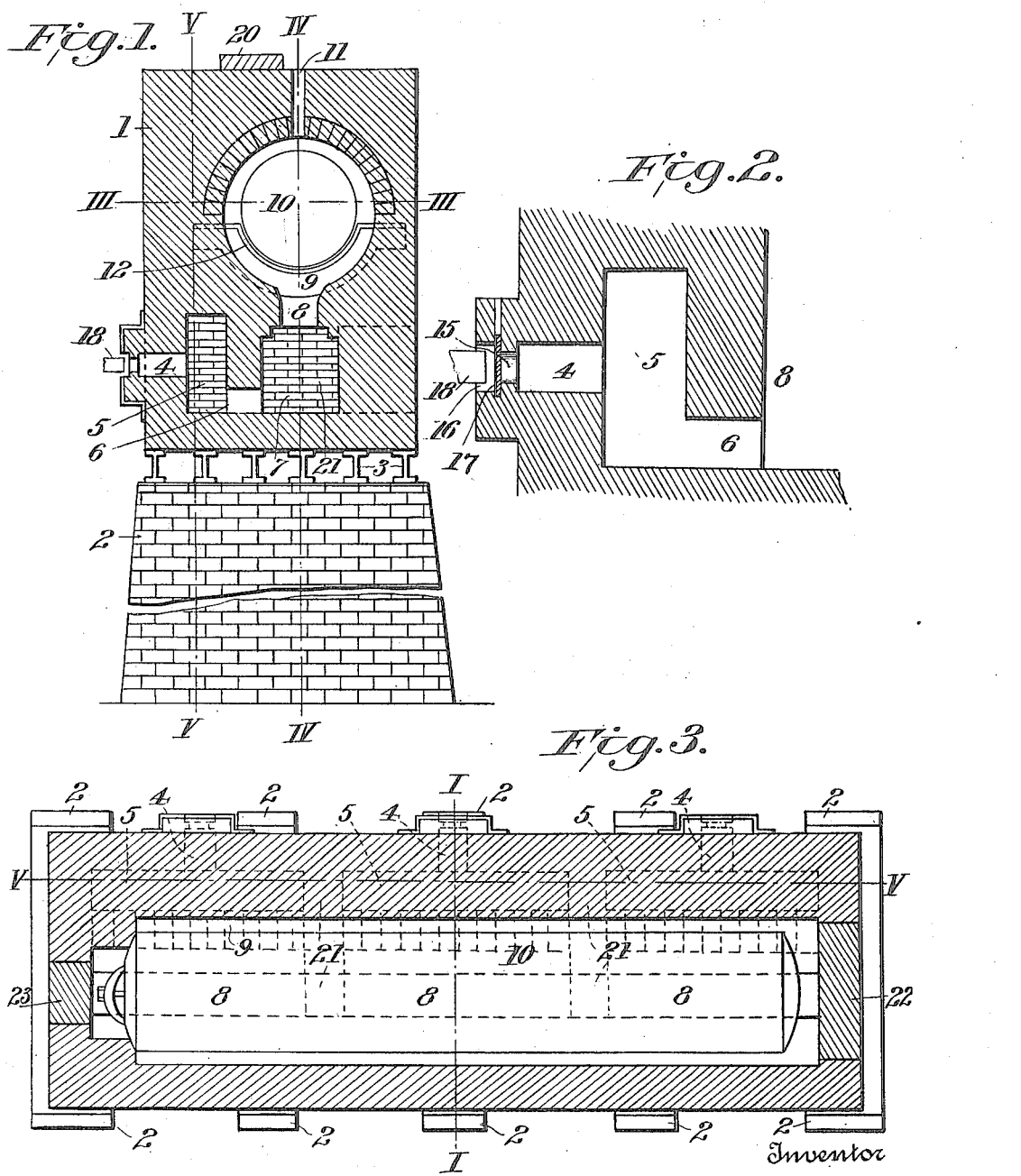

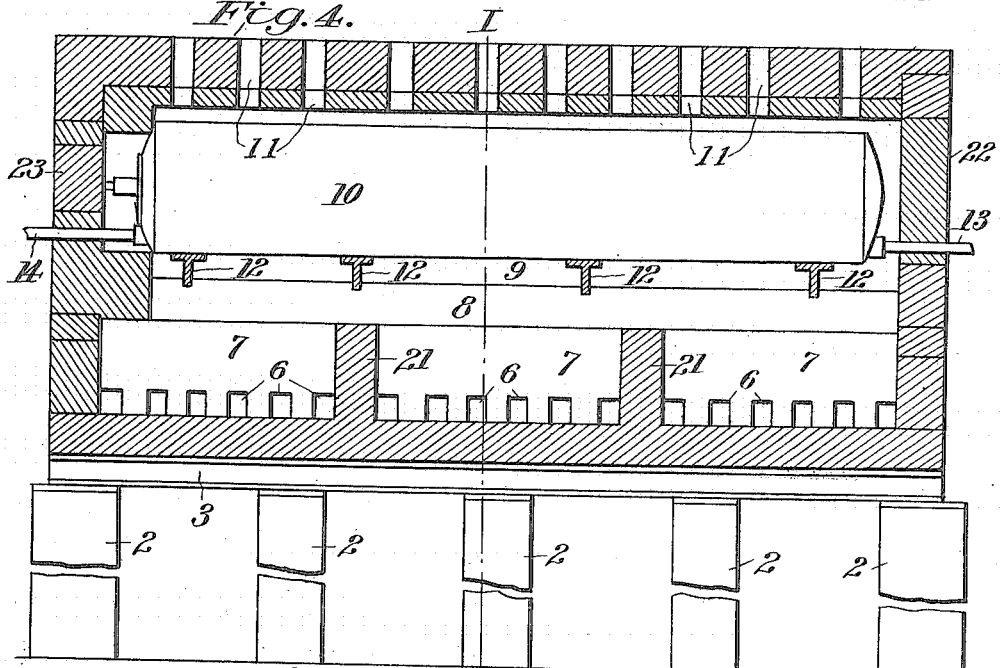
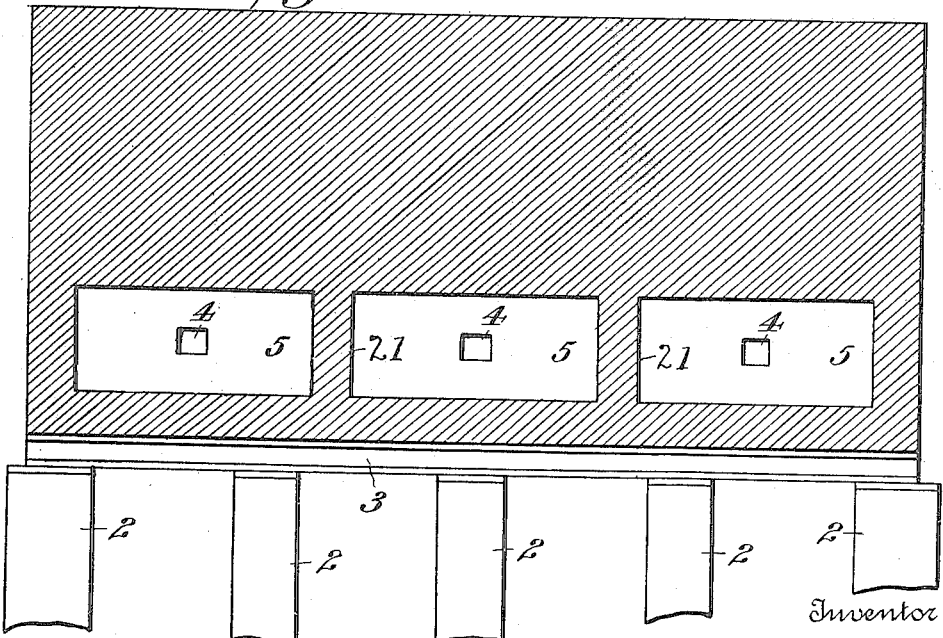

WILLIAM SCRIMGEOUR, OF LANCASTER, PENNSYLVANIA, ASSIGNOR TO MIRCS FUEL OIL EQUIPMENT COMPANY, INCORPORATED, OF LANCASTER, PENNSYLVANIA, A CORPORATION OF PENNSYLVANIA.

TANK-HEATING FURNACE.

1,206,383.      Specification of Letters Patent.      Patented Nov. 28, 1916.

Application filed October 1, 1914. Serial No. 864,521.

*To all whom it may concern:*

Be it known that I, WILLIAM SCRIMGEOUR, a citizen of the United States, residing at Lancaster, in the county of Lancaster and State of Pennsylvania, have invented certain new and useful Improvements in Tank-Heating Furnaces, of which the following is a specification.

This invention relates to heating furnaces, and has for its object to provide means for heating uniformly a long relatively narrow chamber, containing a tank or other article to be heated, by supplying thereto substantially uniform volumes of gases at the same temperature and pressure, throughout its length.

In the accompanying drawings, Figure 1 is a vertical section of the furnace on the line I—I of Figs. 3 and 4; showing the tank to be heated, the arrangement of connected furnace chambers, and flues; Fig. 2 is an enlarged view of the preliminary and main combustion chambers, and a port connecting the main combustion chamber and distributing chamber; Fig. 3 is a horizontal section on the line III—III of Fig. 1, showing the tank, tank chamber, and indicating the preliminary and main combustion chambers; Fig. 4 is a vertical section on the line IV—IV of Fig. 1, showing the arrangement of flues leading into the distributing chambers, and the equalizing channel and heating chamber; and Fig. 5 is a vertical section on the line V—V of Figs. 1 and 3, showing the preliminary combustion chamber opening into the main combustion chamber.

In Fig. 1, the furnace 1, preferably of refractory brick, is supported upon the foundations 2 by means of the iron beams 3. The furnace contains the sets of preliminary combustion chambers 4, opening into the main combustion chambers 5, which communicate with the distributing chambers 7 through a plurality of substantially uniformly distributed ports 6; the sets of connected chambers 5 and 7 are separated from adjacent sets of chambers by the partitions 21, and open into the relatively narrow equalizing channel or chamber 8 which communicates throughout its length with the heating chamber 9, containing the tank 10, or other article to be heated.

The chamber 9 has outlets 11 preferably along its entire length to create a uniformly distributed draft for the products of combustion, dampers 20 being provided to regulate the outlets 11 when desired. The tank 10 is supported upon the saddles 12 secured into the walls of the furnace, and has inlet and outlet pipes 13, 14, for the admission and discharge of fluid to be heated. Removable walls 22, 23, facilitate the insertion and removal of the tank 10, and also provide a means of access to the chamber 9 for repairs, etc.

Each preliminary combustion chamber 4 communicates with its inlet 16, Fig. 2, through the passage 15, admission to which may be closed by the damper 17. A burner 18 at the mouth of the inlet is connected to a suitable source of fuel, not shown, air for combustion entering through the inlet 16 around the sides of the burner. When it is desired to retain the heat in the furnace after shutting off the fuel supply, the dampers 17 and 20 are adjusted to close their respective openings.

The separate combustion and distributing chambers 5 and 7 are provided so that in case the combustion gases from one burner should for any reason be momentarily at higher pressure than those from another, this excess pressure is largely confined to the chambers connected with the burner producing the excess pressure. Where several burners deliver into the same chamber, such excess pressure from one burner tends to extinguish or otherwise interfere with the other burners.

The advantages derived from a furnace containing this arrangement of chambers and construction are numerous. It enables the uniform heating of a long tank or other article throughout its length; the fuel is entirely consumed in the preliminary and main combustion chambers, the latter delivering the intensely heated gases through the numerous ports 6, 6, (Fig. 4) uniformly into the distributing chambers 7, 7, producing therein a uniformly distributed body of gases and from which they pass into the equalizing channel or chamber 8, which equalizes the pressure and velocity of gases from the several chambers 7; the gases then enter the heating chamber 9 as a uniformly dense long flat body of gases, all parts of which are traveling at substantially the same velocity and pressure. The body of heated gases strikes the long tank 10 centrally along its length and divides, equal masses of gases passing up each side of the tank, uniformly heating the same. The tank 10 is placed closer to the exit of the chamber 9 than to the channel 8, thereby retarding the discharge of the gases, and absorbing the maximum quantity of heat therefrom.

I claim:—

1. A heating furnace comprising a long narrow heating chamber having a long narrow channel in the bottom portion thereof, and means for delivering heating gases to said channel comprising a series of combustion devices arranged along the side of the heating furnace, each comprising a burner, a preliminary combustion chamber, a main combustion chamber and a distributing chamber connected thereto by a series of ports, the upper wall of each distributing chamber having an opening connected to the channel in the bottom of the heating chamber.

2. A heating furnace comprising a long narrow heating chamber having a long narrow channel in the bottom portion thereof, and means for delivering heating gases to said channel comprising a series of combustion devices arranged along the side of the heating furnace, each comprising a burner, a preliminary combustion chamber, a main combustion chamber and a distributing chamber connected thereto, the upper wall of each distributing chamber having an opening connected to the channel in the bottom of the heating chamber.

3. A heating furnace comprising a long narrow heating chamber having a long narrow channel in the bottom portion thereof, and means for delivering heating gases to said channel comprising a series of combustion devices arranged along the side of the heating furnace, each comprising a burner, a preliminary combustion chamber, a main combustion chamber and a distributing chamber connected thereto, the upper wall of each distributing chamber having an opening connected to the channel in the bottom of the heating chamber, and a series of vents in the upper wall of the heating chamber.

4. A heating furnace comprising a long narrow heating chamber having a long narrow channel in the bottom portion thereof, and means for delivering heating gases to said channel comprising a series of combustion devices arranged along the side of the heating furnace, each comprising a burner, a preliminary combustion chamber, a main combustion chamber and a distributing chamber connected thereto, the upper wall of each distributing chamber having an opening connected to the channel in the bottom of the heating chamber, a series of vents in the upper wall of the heating chamber, and a tank eccentrically mounted in said heating chamber, the top of the tank being closer to said vents than is its bottom to said channel.

5. A heating furnace comprising a long narrow heating chamber having a long narrow channel in the bottom thereof and vents in its top, a tank eccentrically mounted in said heating chamber, the top of the tank being closer to said vents than is its bottom to said channel, and means for delivering heating gases to said channel.

6. A heating furnace comprising a long narrow heating chamber having a long narrow channel in the bottom thereof and vents in its top, a tank eccentrically mounted in said heating chamber, the top of the tank being closer to said vents than is its bottom to said channel, and means for delivering heating gases to said channel, comprising a series of independent combustion devices.

7. A heating furnace comprising a long narrow substantially closed heating chamber adapted to inclose a long narrow article such as a tank, said chamber having in the bottom thereof a long narrow equalizing channel, a series of separate distributing chambers each opening into said channel, and means for delivering heating gases into said distributing chambers.

8. A heating furnace comprising a long narrow substantially closed heating chamber adapted to inclose a long narrow article such as a tank, said chamber having in the bottom thereof a long narrow equalizing channel, a series of separate distributing chambers each opening into said channel, means for delivering heating gases into said distributing chambers, comprising combustion chambers connected to said distributing chambers and burners connected to said combustion chambers.

In testimony whereof I affix my signature in presence of two witnesses.

WILLIAM SCRIMGEOUR.

Witnesses:
MARY HETRICK,
HELEN BEAR.